United States Patent [19]

Heath et al.

[11] Patent Number: 4,501,032
[45] Date of Patent: Feb. 26, 1985

[54] CHILD RESTRAINT BASSINET

[75] Inventors: Robert B. Heath; Colin M. Nagel, both of Adelaide, Australia

[73] Assignee: Rainsfords Metal Products Pty. Ltd., Lonsdale, Australia

[21] Appl. No.: 407,043

[22] Filed: Aug. 11, 1982

[30] Foreign Application Priority Data

Aug. 20, 1981 [AU] Australia ............... PF0346

[51] Int. Cl.³ ............................................. A47D 7/04
[52] U.S. Cl. ............................................. 5/94; 5/118; 297/216
[58] Field of Search ................. 5/94 R, 118; 297/216, 297/250; 292/201, DIG. 20

[56]  References Cited

U.S. PATENT DOCUMENTS

| 2,735,476 | 2/1956 | Fieber | 297/216 |
| 2,777,531 | 1/1957 | Erickson | 297/216 |
| 3,645,548 | 2/1972 | Briner | 297/216 |
| 4,085,963 | 4/1978 | Bullerdieck | 297/216 |
| 4,345,791 | 8/1982 | Bryans et al. | 297/216 |
| 4,348,048 | 9/1982 | Thevenot | 297/250 |
| 4,383,713 | 5/1983 | Roston | 5/431 |

FOREIGN PATENT DOCUMENTS 2303682 3/1976 France ..................... 5/94

Primary Examiner—Alexander Grosz
Assistant Examiner—Michael F. Trettel
Attorney, Agent, or Firm—Norbert P. Holler

[57] ABSTRACT

A bassinet assembly having a trigger latch which is actuated only by acceleration acting on the restraint above a threshold level to release a bassinet and allow it to swing from its normal recumbent position to a position wherein it engages and is arrested by its base at such an angle that a child is still safely restrained in the case of an accident.

14 Claims, 3 Drawing Figures

CHILD RESTRAINT BASSINET

This invention relates to a bassinet assembly comprising a support base and a bassinet, and which can be used as a restraint means for a child, when the bassinet assembly is carried in a motor vehicle.

BACKGROUND OF THE INVENTION

It has already been proposed to utilise a child restraint bassinet in a vehicle, wherein the bassinet is normally lying with its base parallel to the ground, or nearly parallel to the ground, but provided with hinge means connected to the head and foot end of the bassinet, and arranged so that the bassinet will swing in a pendulum-like manner in a forward direction upon impact of the vehicle so that the mass of a child in that bassinet still bears against the base of the bassinet. However, there are certain difficulties encountered with this type of child restraint, the first of which is the tendency of the device to swing under conditions of low acceleration or minor impact only, and secondly when the head and toe ends of the bassinet extend transversely with respect to the direction of vehicle travel, the bassinet assembly occupies a large amount of seat space, for example, in the rear seating portion of a vehicle to occupy two adult seating positions.

One object of this invention is to provide means which will still enable a child to be restrained satisfactorily upon impact, for example, by bearing against the bottom wall of the bassinet, but wherein the bassinet can have the head and toe ends aligned with the direction of travel, and be unlikely to be dislodged on anything less than a threshold level of acceleration (for example, 5 g.).

BRIEF SUMMARY OF THE INVENTION

In one embodiment of this invention there is provided a bassinet assembly having a trigger latch which is actuated only by acceleration acting on the restraint above a threshold level to release a bassinet and allow it to swing from its normal recumbent position to a position wherein it engages and is arrested by its base at such an angle that a child is still safely restrained in the case of an accident.

More specifically, in one aspect of this invention, a bassinet assembly comprises a support base and a bassinet carried by the support base for movement relative thereto, a trigger latch also carried by the support base for movement relative thereto, and having a latch surface which releasably engages a complementary surface on the bassinet, but the trigger latch having such weight that, upon being subjected to an acceleration force exceeding a threshold level being applied to the assembly in one direction, the trigger latch moves to retract from said bassinet complementary surface, so that the bassinet moves with respect to the support base and its movement is arrested by engagement of surfaces of the bassinet against surfaces of the base after said bassinet movement has tilted the bassinet.

In an embodiment of the invention there is provided a hinge operatively coupling one end of the bassinet to the support base, a trigger latch having a latch surface which supports the other end of the bassinet against pivotal movement towards the support base, a pivot operatively coupling the trigger latch near its latch surface to said support base, and an arm depending from the pivot and being of such weight that, upon being subjected to an acceleration force which exceeds a threshold level applied to the assembly in one direction, the arm swings about its pivot and thereby retracts the latching surface from said bassinet other end, so that in turn, the bassinet swings about its hinge until it engages and is arrested by surfaces on the support base.

With this invention, the bassinet can be simply engaged to a supporting base from which it can be readily removed and used for carrying a small child, and the engagement means can function as a pivotal mounting which enables the bassinet to move when an impact is sufficient to actuate the trigger latch.

However, it is desirable to positively locate a bassinet with respect to a supporting base for various reasons including the need to avoid inadvertent release of the pivoting means between the bassinet and support base, and in one embodiment of this invention the bassinet carries on it a finger actuated latch which is spring loaded towards a locking position, but can be released by depression of the latch against its spring, an upwardly facing surface of the spring loaded finger latch engaging an abutment surface of the support base while the trigger latch surface engages a lower surface of the finger latch. This arrangement provides a very firm positive locked recumbent position of the bassinet, and also provides means whereby any rebound which might occur after the bassinet swings downwardly and forwardly due to impact is limited by the finger latch re-engaging the support base latching surface, such that the rebound is sufficiently small that a child is unlikely to be thrown from the bassinet or otherwise injured.

Although the supporting base can, for example, be a metal frame or pressing, in one embodiment of the invention the supporting base is provided with wedging surfaces being, for example, surfaces of a moulding of polymeric material, and the bassinet is provided with a projecting downturned flange, which engages the wedging surfaces of the supporting base before the bassinet has completed its pivotal movement caused by vehicle impact, and otherwise arrested by the base, thereby functioning as an energy absorber. The invention may also embody further energy absorbing means, as described herein.

BRIEF DESCRIPTION OF THE DRAWINGS

An embodiment of the invention is described hereunder in some detail with reference to and is illustrated in the accompanying drawings in which.

Figure 1:
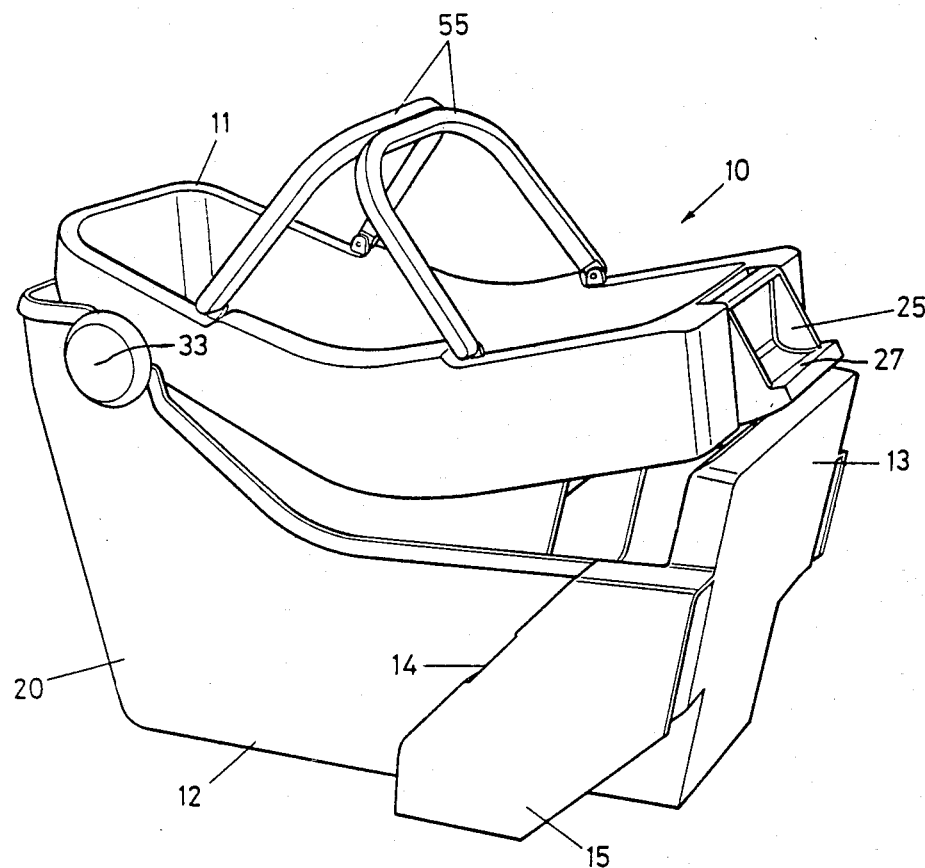
FIG. 1 is a perspective view of a bassinet assembly, showing the bassinet and its support base.

In this embodiment a bassinet assembly 10 comprises two sub-assemblies, one comprising a bassinet 11 and the other a support base 12, both of which are formed from moulding of polymeric material.

The support base sub-assembly 12 is arranged to rest upon a vehicle seat, with the rear wall 13 of the support base bearing against the seat back surface, and the support base sub-assembly 12 is provided with slots 14 in side wings 15 near the lower ends of rear wall 13, which accept the lap portion of a lap belt 16, or a lap/sash belt when that is used in a vehicle, such that an adult's restraint means is usable to restrain any movement of the support base sub-assembly 12 within the vehicle. The belt passes beneath the base and pulls downwardly and rearwardly to hold the base sub-assembly 12 firmly against the vehicle seat and the seat back.

The support base sub-assembly 12 has upstanding side walls 20, and near the front the side walls 20 contain a pair of respective transversely aligned slots 21 each with forwardly extending surfaces which form the slots 21, which extend forwardly from upper edges of the side walls 20, into rearwardly facing hooks 22. The rear wall 13 of the support base sub-assembly 12 is provided with a pair of ramps 24 spaced from one another and engageable by a finger latch 25, the ramps 24 terminating in downwardly facing abutment surfaces 26, both of which abut an upwardly facing surface 27 of the finger latch 25 when the bassinet is in its recumbent position, as described below. A pivot pin 29 interconnects the finger latch 25 to the bassinet for pivotal movement, and the lower end of the finger latch 25 is biassed outwardly by spring 31.

The bassinet has a pair of outstanding hinge pins 33 in its front end, and the arrangement is such that the hinge pins 33 can be moved into the open mouths of the rearwardly facing hooks 22 and then moved forwardly to have their forward movement arrested by the ends of the hook slots, whereupon the bassinet can be hinged downwardly about the axis of pins 33 so that the lower end of the finger latch 25 rides over the ramps 24 which depress the finger latch against its spring until such time as the upwardly facing surface 27 engages beneath the abutment surfaces 26 by action of spring 31, and is restrained from upward movement by the two surfaces 26.

A trigger latch 35 comprises an arm 36 pivoted at 36a near its upper end, and having a weight 37 at its lower end, which upon sudden impact of a vehicle will swing forwardly thereby pivoting the top end of the latch 35 rearwardly. The top end of the latch 35 comprises a latch surface 39 which normally lies beneath the finger latch 25 and thereby supports that end of the bassinet 11 against downward hinging movement within the support base sub-assembly 12. However, the rearward movement of the latch upper end results in release of the finger latch, in turn releasing the bassinet so that it is free to hinge downwardly and forwardly under the acceleration forces, and the bassinet 11 will finally come to rest against the support base sub-assembly 12. This will present the child's back in the direction of impact and thereby widely distribute the forces acting on the child and avoid spinal compression. In order to reduce the impact forces, the bassinet is moulded to have downturned flanges 42, and these engage sloping inner surfaces of the side walls 20 on the support base sub-assembly 12 with a continuously increasing resilient force which has the effect of decelerating the bassinet over a longer period of time than otherwise. To further restrain deceleration upon impact, the support base sub-assembly 12 is provided with a floor 44 with an upwardly projecting bulge 45 ("bubble"), located to arrest the downward hinging movement. The springs of a vehicle seat also assist in reducing deceleration forces. Still further, the bassinet 11 has downwardly projecting moulded support feet 46 of such dimension that they can punch their way through the floor 44 upon extreme impact, and the bassinet thereby absorbs much energy, and at the same time provides "tell-tale" means which identifies that the assembly has been subject to severe impact forces and should therefore be discarded.

The base of the bassinet 11 has two pairs of apertures 48 moulded therein, and two tension pads 49 and 50 are joined beneath the bassinet by buckles 51 on the ends of staps 52 projecting from the pads 49 and 50. These pads wrap around the trunk of a baby, between the hips and armpits, and retain the baby in the bassinet in the event of a vehicle overturn. Joining is by means of a hooked fabric strip 54 on the pad 49 which releasably engages the outer surface of pad 50. Such a strip is generally available under the Trade Mark VELCRO.

Handles 55 facilitate transport of the bassinet 11 to and from its support base sub-assembly 12.

Figure 2:
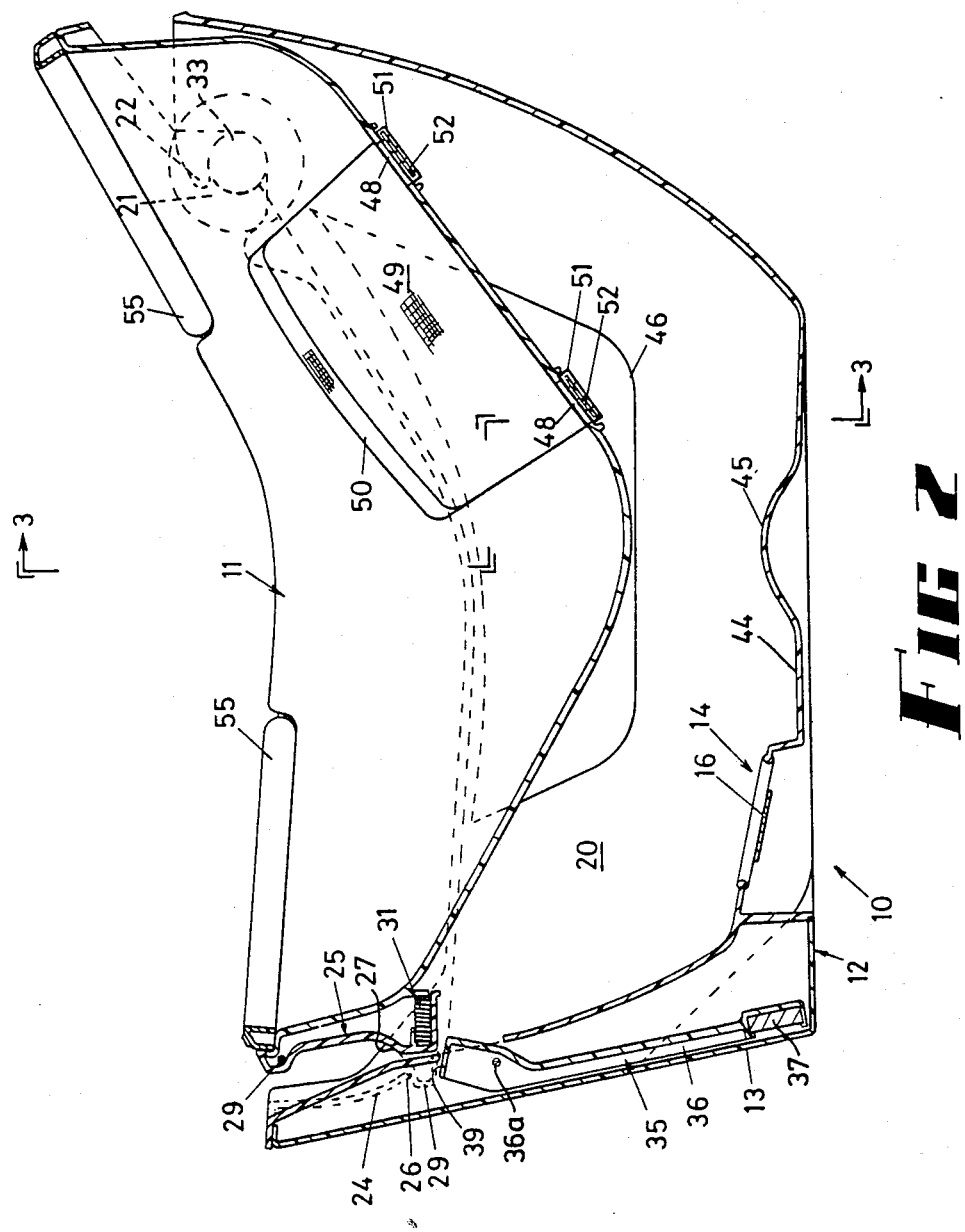
FIG. 2 is a central longitudinal section through the assembly.
Figure 3:
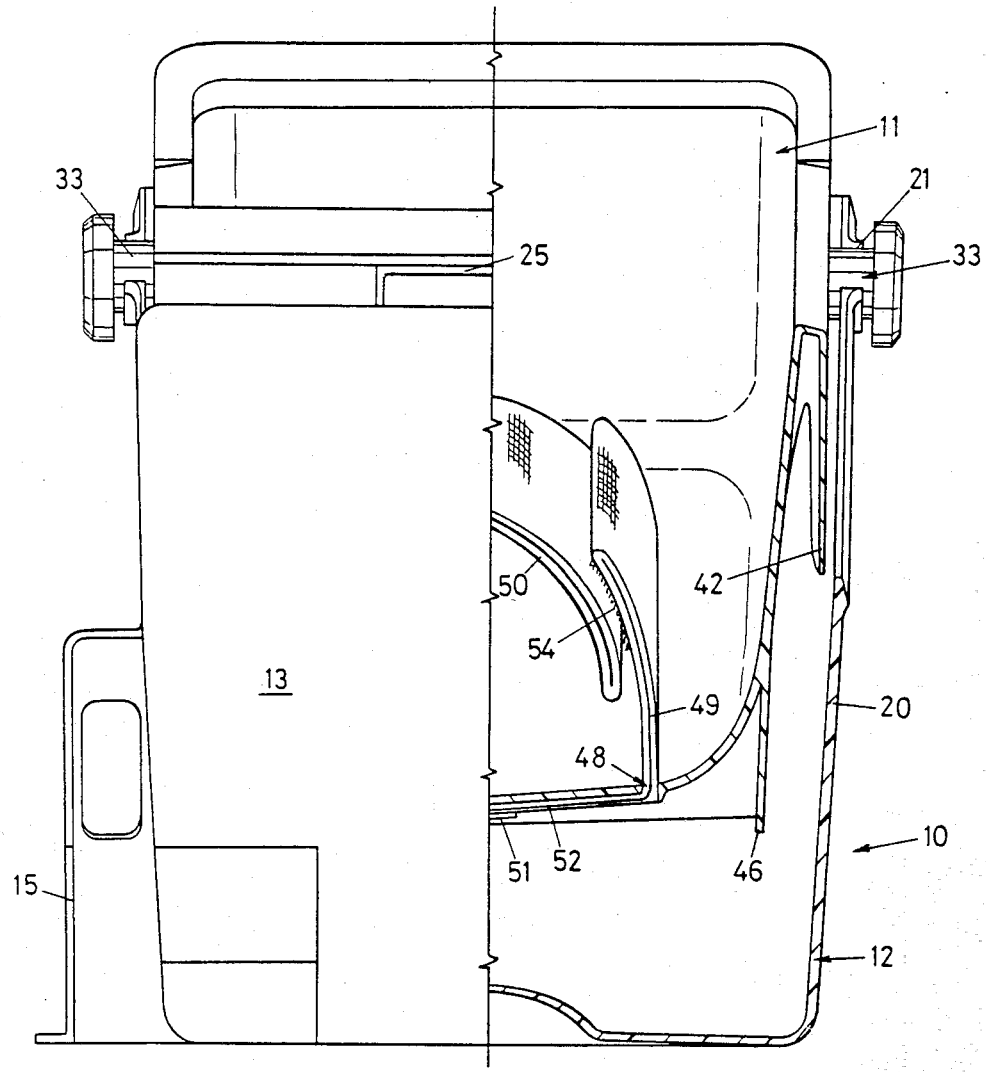
FIG. 3 is a half end elevational section taken on line 3—3 of FIG. 2.

A consideration of the above embodiment will indicate that the bassinet remains suitably stable within the vehicle until such time as there is sufficient impact to require its release. It will be seen that it can be arranged with its head to toe central plane in a fore and aft direction. When the recumbent attitude is as shown in FIG. 2, the device can be used in the front or rear seats of all but the very small vehicles in general use. The use of an inertia latch and the abutment surfaces of ramps 24 engaging lower and upper respective surfaces of the finger latch 25 of the bassinet ensures safe and stable positioning. In the event of rebound which can often occur after vehicle impact, the finger latch is effective in limiting the amount of movement such that it is unlikely a child retained in the bassinet will be thrown out. It will be appreciated that the invention makes it possible to use a net arrangement for additional safety for a child (if and when that is required) and the child can be retained within the bassinet by use of a jacket which is secured thereto for example with straps. In the case of vehicle roll-over, the inertia latch is likely to reset automatically. The bassinet is "rearward facing" and is so contoured to ensure a baby is in the safest attitude in the case of accident. The tension pad arrangement is much safer than either of the other alternatives, namely harness or zip-up pouch. The bassinet can be positioned into a wheeled frame to function as a perambulator for use other than in a motor vehicle. If an accident occurs, a baby can be quickly and easily removed in a single action by a rescuer.

What is claimed is:

1. A bassinet assembly comprising two sub-assemblies, one incorporating a support base and the other incorporating a bassinet, and a hinge operatively coupling a forward end of the bassinet sub-assembly near its upper edge to a corresponding end of the support base for movement relative thereto,
    one of said sub-assemblies comprising a trigger latch near its rear end, said trigger latch comprising a latch surface which abuts a complementary surface on the other said sub-assembly and thereby restrains the bassinet, but said trigger latch being of such weight that, upon being subjected to an acceleration force exceeding a threshold level being applied to the assembly in a rearward direction, the trigger latch moves to disengage from abutment with said complementary surface and allows downward and forward hinging movement of the bassinet sub-assembly with respect to the support base, said hinging movement being arrested by engagement of the surfaces of the bassinet against surfaces of the base,
    one of said sub-assemblies also comprising a finger latch having a surface which releasably engages a surface of the other said sub-assembly and releasably retains the bassinet sub-assembly from upward and rearward movement with respect to the base sub-assembly.

2. A bassinet assembly according to claim 1 wherein said hinge is a pin and hook type hinge, there being two pins outstanding from one of said sub-assemblies engaging the surfaces of respective hooks in the other said sub-assembly.

3. A bassinet assembly according to claim 1 wherein said hinge comprises a pair of pins outstanding from the bassinet near the forward end thereof, and surfaces on the support base define a pair of rearwardly facing hooks, said pins being releasably insertable into said hooks.

4. A bassinet assembly according to claim 3 wherein said trigger latch surface which supports the other end of said bassinet against said hinging movement and said complementary surface is a surface on the upper end of said trigger latch, and said trigger latch further comprises a pivot beneath but near said latch surface thereof, operatively coupling the trigger latch to the support base, and an arm depending from the pivot, the arm embodying said weight such that, when subjected to said acceleration force, the arm swings about its pivot and thereby retracts said latch upper surface from abutment with said complementary surface.

5. A bassinet assembly according to claim 1 further comprising a pair of tension pads, joining means to join the tension pads such that they can retain a baby in the bassinet by engagement of the baby's body between the hips and armpits, and retention means retaining the tension pads to the bassinet.

6. A bassinet assembly according to claim 5 wherein said tension pad retention means comprise straps and buckles.

7. A bassinet assembly according to claim 5 wherein said tension pad joining means comprise a hooked fabric strip.

8. A bassinet assembly comprising two sub-assemblies one incorporating a support base and the other incorporating a bassinet, a hinge operatively coupling the front end of the bassinet near its upper edge to the support base, a trigger latch having an upper surface which is a latch surface which engages a complementary surface on the bassinet sub-assembly and supports the other end of the bassinet against forward and downward hinging movement towards the support base, a pivot operatively coupling the trigger latch near its latch surface to said support base, and an arm depending from the pivot and being of such weight that, upon being subjected to an acceleration force which exceeds a threshold level applied to the assembly in one direction, the arm swings about its pivot and thereby retracts the latch surface from said complementary surface, so that in turn the bassinet swings downwardly and forwardly about said hinge until it engages and is arrested by surfaces on the support base, and a finger latch on said bassinet having an engagement position and a release position, said finger latch comprising an upwardly facing surface which engages a downwardly facing surface of the support base when the bassinet is supported against movement by said latch surface of the trigger latch and said finger latch is in an engagement position, said upwardly facing surface disengaging from said downwardly facing surface when said finger latch is in a release position.

9. A bassinet assembly according to claim 8 further comprising flanges on the bassinet and downwardly converging walls on the support base, said flanges engaging the downwardly converging walls with an increasing interference upon said hinging of the bassinet.

10. A bassinet assembly according to claim 8 further comprising an upwardly projecting bulge in the floor of said support base that is engaged by said bassinet upon said hinging of the bassinet.

11. A bassinet assembly according to claim 10 further comprising support feet on the bassinet which project downwardly by a sufficient distance to engage said floor.

12. A bassinet assembly according to claim 8 wherein said finger latch has a lower surface which is said complementary surface engaged by the latch surface of the trigger latch.

13. A bassinet assembly according to claim 8 further comprising retention surfaces on the support base which are engageable by the seat belt of a motor vehicle to retain the support base to the seat of that vehicle.

14. A bassinet assembly according to claim 8 further comprising retention surfaces on the support base which are engageable by the seat belt of a motor vehicle to retain the support base to the seat of that vehicle.

* * * * *